United States Patent
Iraha

(10) Patent No.: US 12,472,832 B2
(45) Date of Patent: Nov. 18, 2025

(54) VEHICLE

(71) Applicant: TOYOTA JIDOSHA KABUSHIKI KAISHA, Toyota (JP)

(72) Inventor: Taira Iraha, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 168 days.

(21) Appl. No.: 18/530,325

(22) Filed: Dec. 6, 2023

(65) Prior Publication Data

US 2024/0239210 A1    Jul. 18, 2024

(30) Foreign Application Priority Data

Jan. 13, 2023   (JP) .................................. 2023-004009

(51) Int. Cl.
*B60L 50/51* (2019.01)
*B60L 53/302* (2019.01)
*B60L 53/62* (2019.01)

(52) U.S. Cl.
CPC ............ *B60L 50/51* (2019.02); *B60L 53/302* (2019.02); *B60L 53/62* (2019.02)

(58) Field of Classification Search
CPC ...... B60L 2260/50; B60L 58/25; B60L 53/24; B60L 50/51; B60L 3/12; B60L 50/60; B60L 2240/425; B60L 53/62; B60L 58/26; B60L 2210/10; B60L 2210/30; B60L 58/15; B60L 2210/40; B60L 58/22; B60L 2210/42; B60L 2240/36; B60L 2240/445; B60L 2240/54; B60L 50/61; B60L 53/11; B60L 2220/18; B60L 2240/527; B60L 2240/547; B60L 58/12; B60L 7/10; B60L 2220/14; B60L 2240/545; B60L 2270/36; B60L 50/40; B60L 53/16; B60L 53/302; B60L 53/60; B60L 7/14; H02J 3/32; H02J 2207/40;
(Continued)

(56) References Cited

U.S. PATENT DOCUMENTS

2020/0009980 A1* 1/2020 Ishida .................... B60L 53/14
2020/0076020 A1   3/2020 Ogaki et al.
2020/0164761 A1   5/2020 Shin

FOREIGN PATENT DOCUMENTS

JP   2009-296820 A   12/2009
JP   2013-009509 A    1/2013
(Continued)

*Primary Examiner* — Antony M Paul
(74) *Attorney, Agent, or Firm* — Oliff PLC

(57) ABSTRACT

A vehicle includes a battery, a rotating electric machine, an electric power conversion device, a charging device, and a control device. When the battery is charged, the charging device supplies direct-current power to a neutral point of the rotating electric machine, and the rotating electric machine and the electric power conversion device boost the direct-current power and supply the power to the battery. During traveling, the control device predicts a traveling time to a charging place, and executes a control that restrains rise in the temperature of a charging group in a case where the predicted traveling time is equal to or shorter than a criterion time and where a condition is satisfied, the condition being a condition that temperatures of the battery, the rotating electric machine and the electric power conversion device that are included in the charging group is higher than a criterion temperature.

6 Claims, 6 Drawing Sheets

(58) Field of Classification Search
CPC .. H02P 27/06; H02P 27/08; H02P 3/14; H02P 29/60; H02P 29/68; H02P 29/64; H02P 27/14; H02P 5/74
See application file for complete search history.

(56) References Cited

FOREIGN PATENT DOCUMENTS

| | | |
|---|---|---|
| JP | 6808695 B2 | 1/2021 |
| KR | 10-2020-0061718 A | 6/2020 |

\* cited by examiner

VEHICLE

CROSS-REFERENCE TO RELATED APPLICATION

This application claims priority to Japanese Patent Application No. 2023-004009 filed on Jan. 13, 2023, incorporated herein by reference in its entirety.

BACKGROUND

1. Technical Field

The present disclosure relates to a vehicle.

2. Description of Related Art

Japanese Patent No. 6808695 discloses a configuration in which the cooling of a battery is executed when an indication of charging of the battery is detected during traveling and/or stop of a vehicle.

SUMMARY

An electrified vehicle such as a battery electric vehicle and a hybrid electric vehicle is provided with an alternating-current rotating electric machine (motor generator) that generates drive power for the vehicle. The rotating electric machine generates the drive power using electric power from an in-vehicle battery, and generates electricity by external force (inertial force) at the time of regenerative braking, for example, at the time of deceleration.

In the electrified vehicle, as a system for charging the battery using external electric power (also referred to as "external charging", hereinafter), there is a system that charges the battery by supplying the external electric power to a neutral point of the rotating electric machine. In the electrified vehicle, during the traveling of the vehicle, basically, the rotating electric machine is always used for the above drive power generation and the above regenerative braking. The rotating electric machine generates heat by the electric current that flows through the rotating electric machine, during the drive power generation and the regenerative braking.

Meanwhile, in the case of the system that performs the external charging by supplying electric power to the neutral point of the rotating electric machine, the rotating electric machine, also during the external charging, generates heat by charging current. Therefore, when the temperature of the rotating electric machine is high at the time of the start of the external charging after the stop of the vehicle, the temperature of the rotating electric machine excessively rises during the external charging, causing the decrease in the performance of the rotating electric machine, as exemplified by degradation and failure. Further, when charging operation is restricted for preventing the excessive rise in the temperature of the rotating electric machine, charging efficiency sometimes decreases, for example, charging time increases.

The present disclosure provides a vehicle that allows the charging of the in-vehicle battery through the neutral point of the rotating electric machine and that makes it possible to restrain the decrease in the performance of the rotating electric machine and to improve the efficiency of charging processing.

A vehicle according to an aspect of the present disclosure includes a battery capable of being charged and discharged, a rotating electric machine, an electric power conversion device, a charging device, and a control device. The rotating electric machine is configured to generate traveling drive power using electric power from the battery. The electric power conversion device is configured to convert direct-current power from the battery into alternating-current power and supply the alternating-current power to the rotating electric machine. The charging device is configured to charge the battery using electric power from outside. When the battery is charged, the charging device is configured to supply direct-current power to a neutral point of the rotating electric machine. The rotating electric machine and the electric power conversion device are configured to boost the direct-current power supplied from the charging device, and supply the direct-current power to the battery. During traveling, the control device is configured to (i) acquire a predicted value of a traveling time to a previously given charging place, and (ii) execute a control that restrains rise in a temperature of a charging group in a case where the predicted traveling time is equal to or shorter than a criterion time and where a first condition is satisfied, the first condition being a condition that at least one of temperatures of the battery, the rotating electric machine and the electric power conversion device that are included in the charging group is higher than a criterion temperature.

The vehicle according to the above aspect may further include a cooling device configured to cool the charging group. In a case where the first condition is satisfied, the control device may be configured to increase cooling capacity of the cooling device, compared to a case where the temperature of the charging group is lower than the criterion temperature.

In the vehicle according to the above aspect, the cooling device may include a cooling pump configured to circulate a refrigerant. In the case where the first condition is satisfied, the control device may increase a refrigerant amount that is supplied by the cooling pump.

In the vehicle according to the above aspect, in a case where the first condition is satisfied and where an accelerator operation amount by a user is larger than a criterion operation amount, the control device may be configured to decrease the traveling drive power that is generated by the rotating electric machine, compared to a case where the temperature of the charging group is lower than the criterion temperature.

In the vehicle according to the above aspect, in a case where the first condition is satisfied and where a charge amount stored in the battery is larger than a criterion charge amount, the control device may be configured to decrease regenerative electric power that is generated by the rotating electric machine, compared to a case where the temperature of the charging group is lower than the criterion temperature.

A vehicle according to another aspect of the present disclosure includes a battery capable of being charged and discharged, a rotating electric machine, an electric power conversion device, a charging device, and a control device. The rotating electric machine is configured to generate traveling drive power using electric power from the battery. The electric power conversion device is configured to convert direct-current power from the battery into alternating-current power and supply the alternating-current power to the rotating electric machine. The charging device is configured to charge the battery using electric power from outside. When the battery is charged, the charging device is configured to supply direct-current power to a neutral point of the rotating electric machine. The rotating electric machine and the electric power conversion device are configured to boost the direct-current power supplied from the charging device, and supply the direct-current power to the battery. During traveling, the control device is configured to (i) acquire a predicted value of a traveling distance to a destination, and (ii) execute a control that restrains rise in a temperature of a charging group in a case where the predicted traveling distance is equal to or shorter than a distance to a charging place and where a condition is satisfied, the condition being a condition that at least one of temperatures of the battery, the rotating electric machine and the electric power conversion device that are included in the charging group is higher than a criterion temperature.

With the vehicle according to the present disclosure, during traveling, in the case where the traveling time to the charging place or the traveling distance to the destination falls below the criterion value and the timing of the start of the external charging is coming, the control to restrain the rise in the temperature of the charging group including the rotating electric machine is executed. Thereby, it is possible to restrain the excessive rise in the temperature of apparatuses during charging, and to avoid the charging restriction for protecting apparatuses of the charging group, at the timing of the start of the charging. Accordingly, it is possible to restrain the decrease in the performance of the rotating electric machine, and to efficiently perform the charging processing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
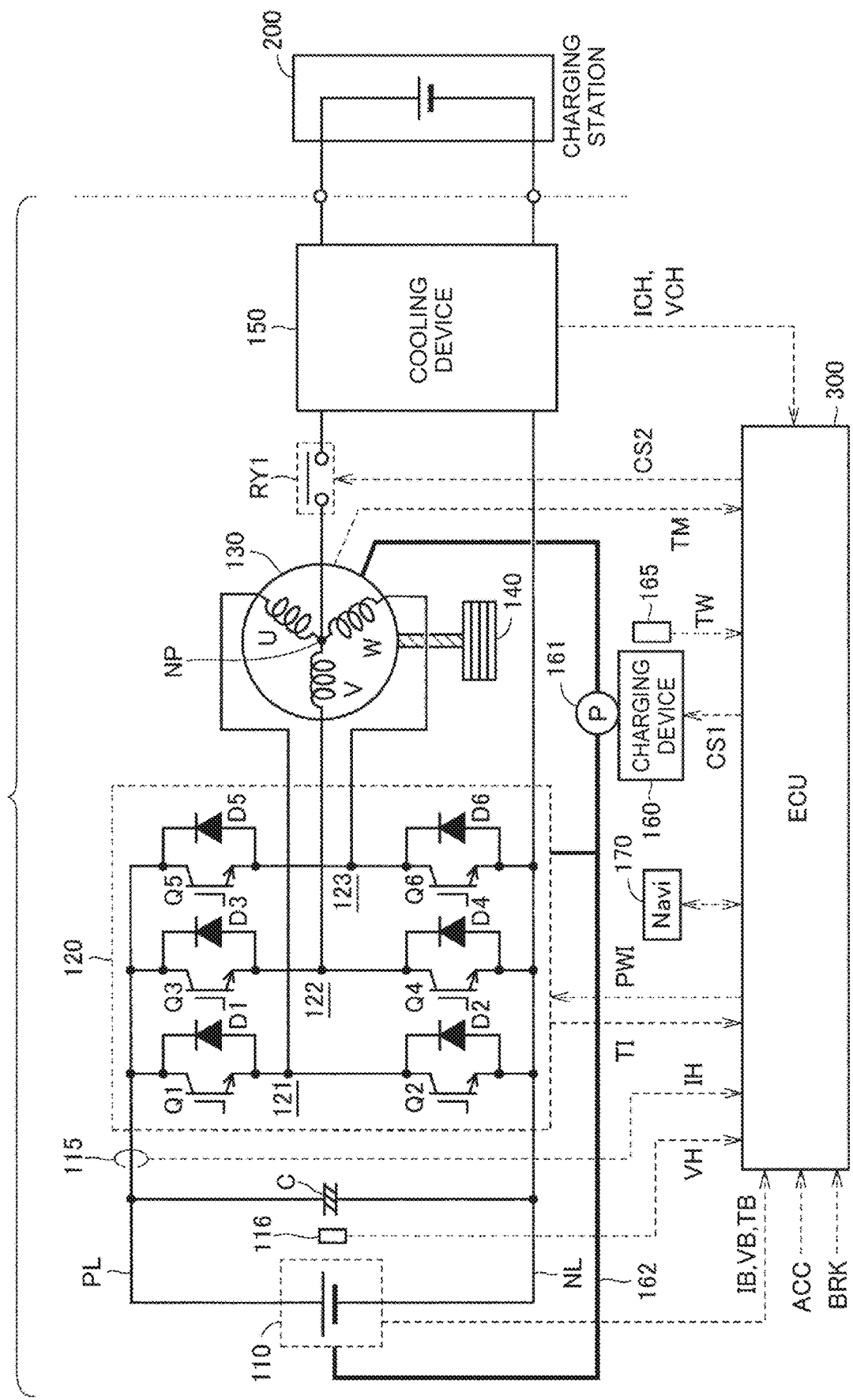
FIG. 1 is a schematic overall diagram of a charging system of a vehicle according to an embodiment 1.

Embodiments of the present disclosure will be described below in detail with reference to the drawings. In the drawings, identical or corresponding portions are denoted by identical reference characters, and descriptions therefor are not repeated.

Embodiment 1

Overline of Charging System

FIG. 1 is a schematic overall diagram of an charging system 10 according to an embodiment 1. In the embodiment, a configuration in which a vehicle 100 is a battery electric vehicle will be described as an example. However, the configuration of the vehicle 100 is not limited to this, and can be applied to any vehicle that can travel using the electric power from a battery. Examples of the vehicle 100 include a hybrid electric vehicle and a fuel cell electric vehicle, in addition to the battery electric vehicle.

With reference to FIG. 1, the vehicle 100 includes a battery 110, a current sensor 115, a voltage sensor 116, an inverter (an electric power conversion device) 120, a motor generator (MG; a rotating electric machine) 130, a drive wheel 140, a charging device 150, a cooling device 160, a temperature sensor 165, a navigation device 170, an electronic control unit (ECU; a control device) 300 that is a control device, and a relay RY1.

The battery 110 is an electric power storage element configured to be capable of being charged and discharged. For example, the battery 110 is configured to include a secondary battery such as a lithium-ion battery, a nickel hydride battery or a lead storage battery, or an electricity storage element such as an electric double-layer capacitor. The battery 110 includes sensors (not illustrated) that detect the voltage, current and temperature of the battery 110. A battery voltage VB, a battery current IB and a battery temperature TB that are detected by the sensors are output to the ECU 300.

The battery 110 is connected to the inverter 120 through electric power lines PL1, NL1. The battery 110 supplies electric power for driving the motor generator 130, to the inverter 120. Further, the battery 110 stores electric power generated by the motor generator 130. For example, the output of the battery 110 is about 800 V.

The inverter 120 is controlled by a control command PWI from the ECU 300, and converts direct-current power supplied from the battery 110, into alternating-current power for driving the motor generator 130.

The inverter 120 includes a U-phase arm 121, a V-phase arm 122, and a W-phase arm 123, which form a three-phase bridge circuit. The U-phase arm 121, the V-phase arm 122, and the W-phase arm 123 are connected in parallel between the electric power line PL1 and the electric power line NL1.

The U-phase arm 121 includes switching elements Q1, Q2 connected in series between the electric power line PL1 and the electric power line NL1, and diodes D1, D2 connected in parallel with the switching elements Q1, Q2 respectively. A cathode of the diode D1 is connected with a collector of the switching element Q1, and an anode of the diode D1 is connected with an emitter of the switching element Q1. A cathode of the diode D2 is connected with a collector of the switching element Q2, and an anode of the diode D2 is connected with an emitter of the switching element Q2.

The V-phase arm 122 includes switching elements Q3, Q4 connected in series between the electric power line PL1 and the electric power line NL1, and diodes D3, D4 connected in parallel with the switching elements Q3, Q4 respectively. A cathode of the diode D3 is connected with a collector of the switching element Q3, and an anode of the diode D3 is connected with an emitter of the switching element Q3. A cathode of the diode D4 is connected with a collector of the switching element Q4, and an anode of the diode D4 is connected with an emitter of the switching element Q4.

The W-phase arm 123 includes switching elements Q5, Q6 connected in series between the electric power line PL1 and the electric power line NL1, and diodes D5, D6 connected in parallel with the switching elements Q5, Q6 respectively. A cathode of the diode D5 is connected with a collector of the switching element Q5, and an anode of the diode D5 is connected with an emitter of the switching element Q5. A cathode of the diode D6 is connected with a collector of the switching element Q6, and an anode of the diode D6 is connected with an emitter of the switching element Q6.

The inverter 120 includes a temperature sensor (not illustrated) that detects the temperature of the inverter 120. An inverter temperature TI that is detected by the temperature sensor is output to the ECU 300.

For example, the motor generator 130 is a three-phase alternating-current electric motor generator including a rotor in which a permanent magnet is buried and a stator that includes a three-phase coil for which Y-connection is performed at a neutral point NP. One end of each of three coils in the U-phase, V-phase and W-phase of the motor generator 130 is connected to the neutral point NP. Moreover, the other end of the U-phase coil is connected to a connection node between the switching elements Q1, Q2. Further, the other end of the V-phase coil is connected to a connection node between the switching elements Q3, Q4. Further, the other end of the W-phase coil is connected to a connection node between the switching elements Q5, Q6. In the motor generator 130, an unillustrated temperature sensor is disposed. A detection value TM that is detected by the temperature sensor is output to the ECU 300.

The output torque of the motor generator 130 is transmitted to the drive wheel 140 through a power transmission gear (not illustrated) constituted by a speed reducer and a power split device, so that the vehicle 100 travels. At the time of the regenerative braking of the vehicle 100, the motor generator 130 can generate electricity using the rotation power of the drive wheel 140. Then, the generated electric power is converted into charging electric power of the battery 110 by the inverter 120.

The current sensor 115 is disposed on the electric power line PL1. The current sensor 115 detects electric current that flows through the electric power line PL1, and outputs a detection value IH of the electric current to the ECU 300. The voltage sensor 116 detects voltage that is applied to a smoothing capacitor C connected between the electric power line PL1 and the electric power line NL1, and outputs a detection value VH of the voltage to the ECU 300.

The cooling device 160 is a device that cools the battery 110, the inverter 120, and the motor generator 130. The cooling device 160 includes a radiator or a refrigeration cycle. The cooling device 160 is controlled by a control signal CS1 from the ECU 300, and cools the battery 110 and the like by circulating a cooled refrigerant through a cooling pipe 162. The temperature sensor 165 detects the temperature of the refrigerant after the circulation, and outputs a detection value TW of the temperature to the ECU 300.

The navigation device 170 includes an unillustrated touch panel, and performs guidance while presenting a traveling route to a destination designated by the user. The navigation device 170 predicts a traveling distance to the destination input by the user and a traveling time to the destination, and displays the traveling distance and the traveling time on the touch panel. The predicted traveling distance and traveling time to the destination are output to the ECU 300.

The charging device 150 receives direct-current power from a charging station 200 provided outside of the vehicle 100, and supplies charging electric power for charging the battery 110. Although not illustrated in FIG. 1, the charging device 150 includes an electromagnetic compatibility (EMC) filter for removing electric power source noise and various sensors that detect a charging current and a charging voltage. A charging current ICH and a charging voltage VCH that are detected are sent to the ECU 300.

A positive electrode of the charging device 150 is connected to the neutral point NP of the motor generator 130 through the relay RY1. A negative electrode of the charging device 150 is connected to the electric power line NL1. The relay RY1 is controlled by a control signal CS2 from the ECU 300, and performs switching between the supply and cut of the charging electric power from the charging device 150 to the motor generator 130.

In the case where the battery 110 is charged by the charging device 150, boost chopper circuits are formed by the coils in the respective phases of the motor generator 130 and the switching elements of the corresponding arms in the inverter 120. Accordingly, the ECU 300 complementarily switches the switching elements of each arm of the inverter 120, so that the voltage (for example, 400 V) of the direct-current power supplied from the charging station 200 is boosted to a voltage (for example, 800 V) appropriate for the charging of the battery 110. In the following description, a configuration including the battery 110, the inverter 120 and the motor generator 130, to which electric power is transmitted at the time of external charging, is also referred to as "charging group".

The ECU 300 includes a central processing unit (CPU), a storage device, and an input-output buffer, each of which is not illustrated in FIG. 1. The ECU 300 controls the vehicle 100 and apparatuses, while receiving signals from sensors and the like and outputting control signals to apparatuses. Controls in the ECU 300 are not limited to processing by software, and may be processed by dedicated hardware (electronic circuit).

The ECU 300 receives the voltage VB and the current IB from the battery 110. The ECU 300 computes the state-of-charge (SOC) of the battery 110 based on the voltage VB and the current IB. The ECU 300 executes a later-described "before-charging cooling control", based on temperature data about apparatuses, the SOC of the battery 110, an accelerator operation amount ACC and brake operation amount BRK by the user, and others during traveling.

Before-Charging Cooling Control

As described above, in the configuration in which the electric power for charging the battery is supplied from the charging device through the neutral point of the motor generator, electric current flows through the inverter and the motor generator in addition to the battery, also when the external charging is performed during the stop of the vehicle. Thereby, the temperatures of the battery, the inverter and the motor generator that constitute the charging group, can rise during the external charging.

On this occasion, when the temperature of each apparatus of the charging group exceeds a corresponding rated temperature, the degradation of the apparatus is promoted or failure occurs, and thereby the decrease in the performance of the apparatus can be caused. Further, when the suspension of the external charging or the restriction of the charging electric power is performed for preventing the bad influence on the apparatus, the charging time to the full charge increases, and there is fear of the decrease in charging efficiency.

Therefore, in the vehicle 100 in the embodiment 1, during traveling, in the case where it is predicted that the timing of the external charging is coming, the "before-charging cooling control" for restraining the rise in the temperature of the charging group including the battery 110, the inverter 120, and the motor generator 130 and keeping the temperature at a predetermined temperature or lower is executed. Thereby, it is possible to restrain the temperature of the charging group from being excessively high at the timing when the external charging is started after the arrival at a charging place such as the destination, and therefore it is possible to protect each apparatus of the charging group and to restrain the decrease in charging efficiency.

First Example

Figure 2:
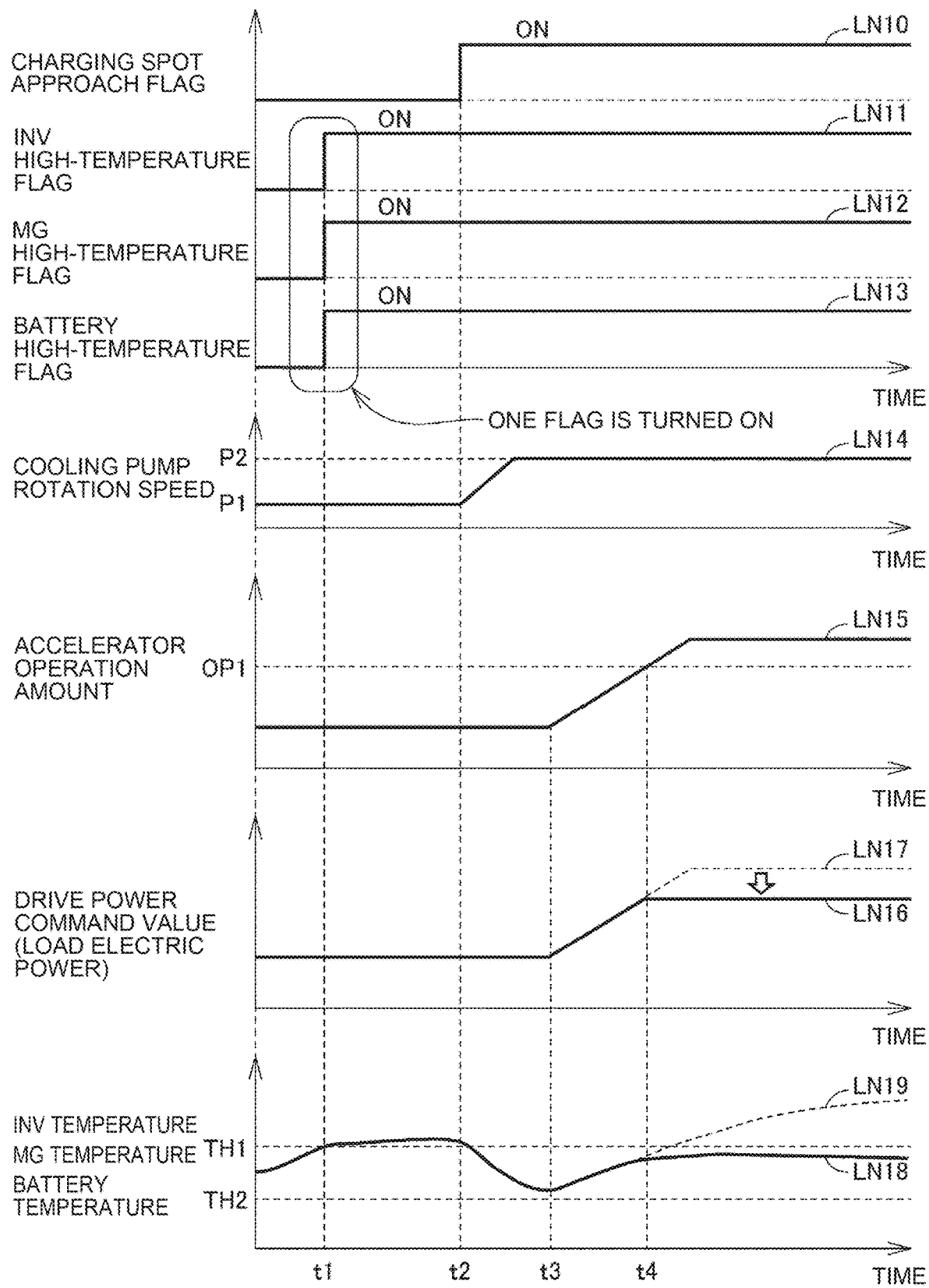
FIG. 2 is a time chart for describing a first example of a before-charging cooling control in the embodiment 1.

FIG. 2 is a time chart for describing a first example of the before-charging cooling control in the embodiment 1. In FIG. 2, the abscissa axis indicates time, and the ordinate axis indicates an approach flag for a charging spot, an inverter (INV) high-temperature flag, a motor generator (MG) high-temperature flag, a battery high-temperature flag, a cooling pump rotation speed, an accelerator operation amount, a drive power command value, and the temperature of the charging group. In the lowest graph of FIG. 2, a case where the temperature of the charging group is the return temperature TW of the refrigerant that is detected by the temperature sensor 165 of the cooling device 160 is described as an example. However, instead of or in addition to this, the individual temperatures of the battery 110, the inverter 120 and the motor generator 130 may be considered. Further, individual estimated temperatures of the battery 110, the inverter 120 and the motor generator 130 may be used. The estimated temperatures are calculated from the refrigerant temperature TW, the drive power command value, and the like.

With reference to FIG. 2, before time t1, the temperature of each apparatus is in a normal range, and the vehicle 100 executes ordinary traveling. At this time, the cooling pump 161 is operated at a rotation speed of P1.

When the refrigerant temperature TW (or the temperature of one of the battery 110, the inverter 120 and the motor generator 130) exceeds a predetermined threshold TH1 (solid line LN18) at time t1, the high-temperature flag is turn on (solid lines LN11, LN12, LN13).

Then, when the traveling time to the arrival at the destination or the charging spot falls below a criterion time based on information from the navigation device 170, the charging spot approach flag is turned on (time t2: solid line LN10).

When the condition (first condition) that the charging spot approach flag is turned on and the high-temperature flag is turned on is satisfied, first, the rotation speed of the cooling pump 161 is increased from P1 to P2, and the amount of the refrigerant for cooling the charging group is increased (solid line LN14). Thereby, the cooling capacity is enhanced, and therefore the temperature of the charging group is gradually decreased. In the case where the cooling device 160 includes the refrigeration cycle, the cooling capacity may be enhanced by decreasing the temperature of the refrigerant itself by adjusting a compressor and/or a pressure reducing valve included in the refrigeration cycle, in addition to the increase in refrigerant amount.

When the temperature of the charging group decreases and falls below a predetermined threshold TH2 (TH1>TH2), the before-charging cooling control ends. On the other hand, when the user steps on the accelerator for acceleration or traveling on an uphill road before the temperature of the charging group decreases to the threshold TH2 (time t3: solid line LN15), the load electric power increases (solid line LN16), and the temperature of the charging group rises (solid line LN18).

Then, when the accelerator operation amount by the user exceeds a criterion operation amount OP1 (time t4), the drive power is restricted by the ECU 300. In FIG. 2, after time t4, the drive power is set so as to be lower (solid line LN16), compared to a case where the drive power is not restricted (broken line LN17). Thereby, the temperature of the charging group is maintained so as to be lower (solid line LN18), compared to the case where the drive power is not restricted (broken line LN19).

Although not illustrated in FIG. 2, when the acceleration operation amount by the user falls below the criterion operation amount OP1, the restriction of the drive power is cancelled. Further, when the temperature of the charging group falls below the threshold TH2, the before-charging cooling control ends.

In this way, in the case where the charging start timing is coming, when the temperature of the charging group including the battery 110, the inverter 120 and the motor generator 130 rises to the predetermined threshold or higher, it is possible to maintain the temperature of the charging group at the threshold or lower by increasing the cooling capacity of the cooling device 160. Furthermore, in the case where the increase amount of the drive power exceeds the predetermined value by user's accelerator operation, it is possible to restrain the rise in the temperature of the charging group by restricting the drive power command value. Accordingly, the temperature of the charging group is restrained from being excessively high at the time of the arrival at the charging spot, and therefore it is possible to restrain the decrease in the performance of the charging group including the rotating electric machine, and to efficiently perform charging processing.

Second Example

Figure 3:
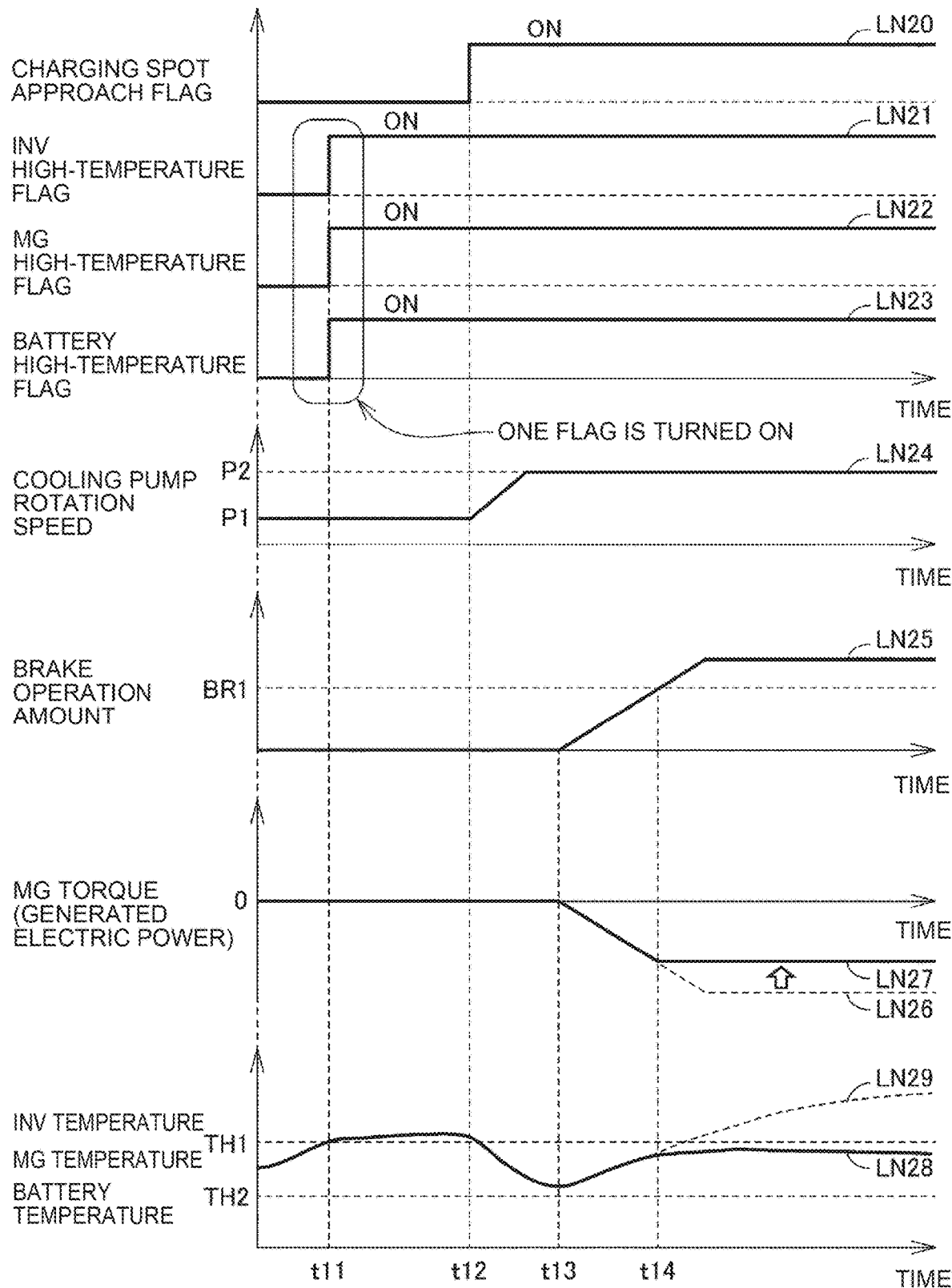
FIG. 3 is a time chart for describing a second example of the before-charging cooling control in the embodiment 1.

FIG. 3 is a time chart for describing a second example of the before-charging cooling control in the embodiment 1. In the second example, a configuration in which the regenerative electric power by user's brake operation is restricted in the case where the cooling capacity of the cooling device 160 is increased and where the SOC of the battery 110 is higher than a criterion charge amount will be described. Solid lines LN20 to LN24, a solid line LN28 and a broken line LN29 in FIG. 3 correspond to the solid lines LN10 to LN14, the solid line LN18 and the broken line LN19 in FIG. 2. Therefore, in FIG. 3, the relation between the brake operation amount by the user and the regenerative electric power of the motor generator 130 during the execution of the before-charging cooling control will be mainly described.

With reference to FIG. 3, when the condition (first condition) that the charging spot approach flag is turned on and the high-temperature flag is turned on is satisfied (time t12), the rotation speed of the cooling pump 161 is increased from P1 to P2, and the amount of the refrigerant for cooling the charging group is increased, similarly to the case of FIG. 2.

When the user operates the brake for deceleration before the temperature of the charging group decreases to the threshold TH2, that is, while the before-charging cooling control is continued (solid line LN25), negative torque acts on the motor generator 130, and electric power is generated by regenerative operation. Thereby, the temperature of the charging group rises (solid line LN28).

Then, in the case where the SOC of the battery 110 is higher than a criterion charge amount, when the brake operation amount by the user is larger than a criterion operation amount BR1 (time t14), the regenerative electric power by the motor generator 130 is restricted by the ECU 300. In FIG. 3, after time t14, the magnitude of the negative torque of the motor generator 130 is set so as to be lower (solid line LN26), compared to a case where the regenerative electric power is not restricted (broken line LN27). Thereby, the temperature of the charging group is maintained so as to be lower (solid line LN28), compared to the case where the regenerative electric power is not restricted (broken line LN29).

The braking power lost by the restriction of the regenerative electric power is recovered by increasing the braking power of a hydraulic mechanical brake.

Although not illustrated in FIG. 3, in the case where the brake operation amount by the user falls below the criterion operation amount BR1, the restriction of the regenerative electric power is cancelled. Further, when the temperature of the charging group falls below the threshold value TH2, the before-charging cooling control ends. The restriction of the regenerative electric power in the before-charging cooling control described in the second example can be applied to the configuration in the first example.

Also in the configuration in the second example, the temperature of the charging group is restrained from being excessively high at the time of the arrival at the charging spot, and therefore it is possible to restrain the decrease in the performance of the charging group including the rotating electric machine, and to efficiently perform charging processing.

Flowchart

Figure 4:
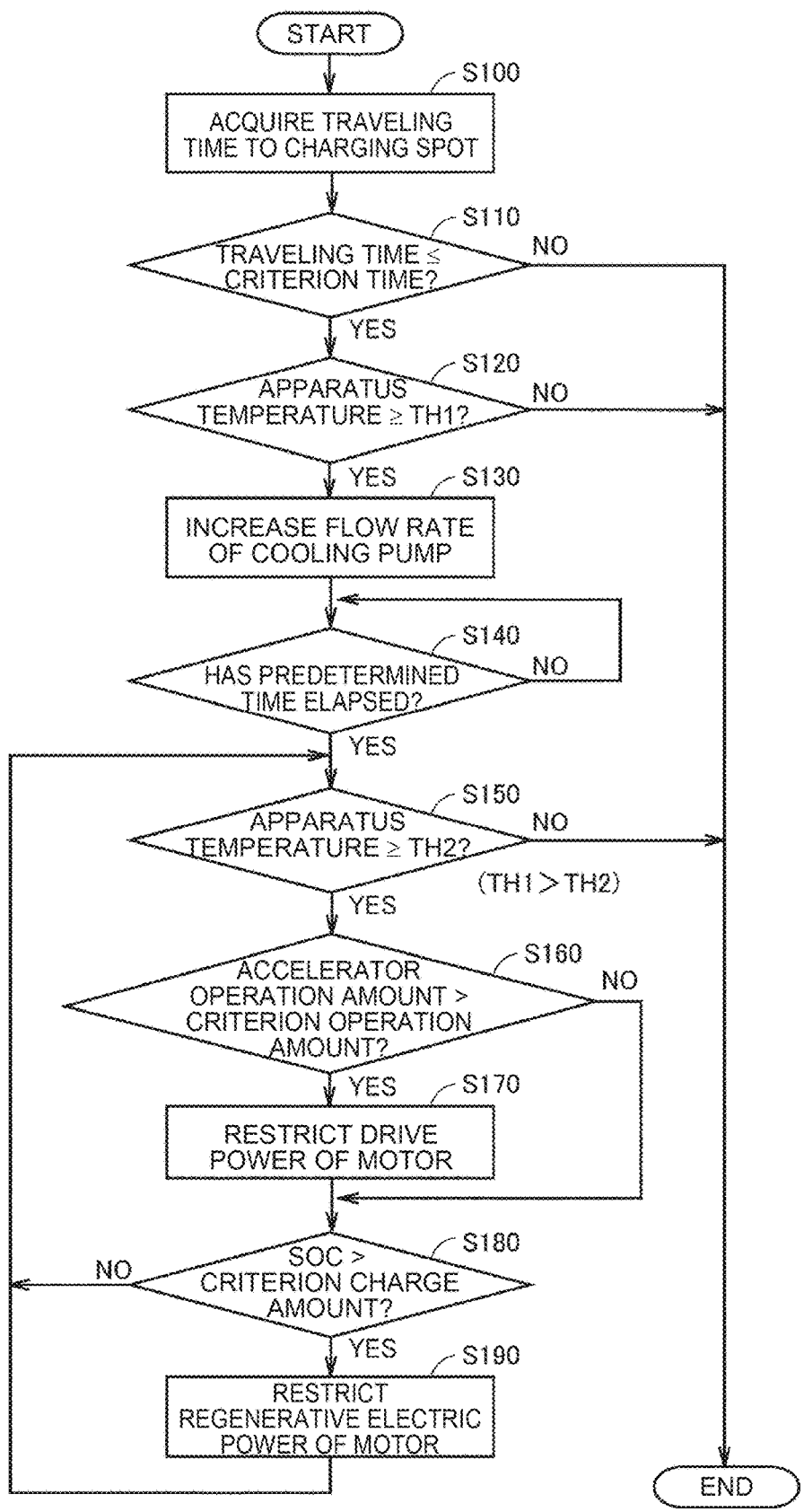
FIG. 4 is a flowchart for describing a process for the before-charging cooling control that is executed by an ECU in the embodiment 1.

FIG. 4 is a flowchart for describing a process for the before-charging cooling control that is executed by the ECU 300. In FIG. 4, a process in the case where the configuration in the first example and the configuration in the second example are combined will be described.

With reference to FIG. 4, in step (hereinafter, step is abbreviated to S) 100, the ECU 300 acquires a predicted value of the traveling time to the destination or the charging spot near the destination, from the navigation device 170. Then, in S110, the ECU 300 determines whether the predicted traveling time is equal to or shorter than the criterion time, that is, whether the timing of the external charging is coming.

In the case where the predicted traveling time is longer than the criterion time (NO in S110), the ECU 300 determines that there is still a sufficient time to the execution of the external charging, and skips subsequent processes to end the process.

On the other hand, in the case where the predicted traveling time is equal to or shorter than the criterion time (YES in S110), the ECU 300 determines that the timing of the external charging is coming. Then, the ECU 300 causes the process to proceed to S120, and determines whether the apparatus temperature of the battery 110, the inverter 120 and the motor generator 130 that are included in the charging group is equal to or higher than the threshold TH1. In the case where the determination is performed based on the individual temperature of each apparatus, the threshold TH1 is individually set in accordance with the rated temperature of each apparatus.

In the case where the apparatus temperature is lower than the threshold TH1 (NO in S120), the cooling control is unnecessary, and therefore the ECU 300 skips subsequent processes to end the process.

On the other hand, in the case where the apparatus temperature is equal to or higher than the threshold TH1 (YES in S120), the process proceeds to S130. In S130, the ECU 300 controls the cooling device 160, to increase the flow rate of the cooling pump 161. Thereby, the cooling capacity of the cooling device 160 is increased. Then, the ECU 300 determines whether a predetermined time has elapsed from the increase in the flow rate of the cooling pump 161. The predetermined time is a time during which the cooling of the charging group is executed by the increase in refrigerant amount, and is set to about 10 minutes, for example.

In the case where the predetermined time has not elapsed (NO in S140), the process returns to S140, and the ECU 300 waits until the predetermined time has elapsed. Then, when the predetermined time has elapsed (YES in S140), the process proceeds to S150, and the ECU 300 determines whether the apparatus temperature is equal to or higher than the threshold TH2 (TH1>TH2), that is, whether each apparatus of the charging group has been sufficiently cooled.

In the case where the apparatus temperature is lower than the threshold TH2 (NO in S140), the ECU 300 determines that each apparatus of the charging group has been sufficiently cooled, and skips subsequent processes to end the before-charging cooling control. Although not illustrated in FIG. 4, when the before-charging cooling control ends, the flow rate of the cooling pump 161 is restored to the initial flow rate.

On the other hand, in the case where the apparatus temperature is equal to or higher than the threshold TH2 (YES in S140), the process proceeds to S160, and subsequently, the ECU 300 determines whether the accelerator operation amount by the user is larger than the criterion operation amount. In the case where the accelerator operation amount is larger than the criterion operation amount (YES in S160), the process proceeds to S170, and the ECU 300 restricts the drive power of the motor generator 130. In the case where the accelerator operation amount is equal to or smaller than the criterion operation amount (NO in S160), S170 is skipped, and the process proceeds to S180.

In S180, the ECU 300 determines whether the SOC of the battery 110 is higher than the criterion charge amount. In the case where the SOC is equal to or lower than the criterion charge amount (NO in S180), the process returns to S150. In the case where the SOC is higher than the criterion charge amount (YES in S180), the process proceeds to S190. In S190, in the case where the brake operation amount by the user is larger than the criterion operation amount, the ECU 300 restricts the regenerative electric power by the motor generator 130. Thereafter, the process returns to S150.

After the process returns to S150, the ECU 300 continuously restricts the drive power and/or regenerative electric power of the motor generator 130, in accordance with the accelerator operation and brake operation by the user, until the apparatus temperature decreases to the threshold TH2.

By performing the control in accordance with the above-described process, the temperature of the charging group is restrained from being excessively high at the time of the arrival at the charging spot, and therefore it is possible to restrain the decrease in the performance of the charging group including the rotating electric machine, and to efficiently perform charging processing.

Modification

In the first example and second example of the above embodiment 1, the configuration in which the cooling capacity of the cooling device 160 is first increased by increasing the refrigerant amount of the cooling device 160 and then the drive power and/or regenerative electric power of the motor generator 130 are restricted has been described.

In the following modifications, a configuration in which the rise in the temperature of the charging group is restrained by only the restriction of the drive power of the motor generator 130 or only the restriction of the regenerative electric power of the motor generator 130 will be described.

Figure 5A:
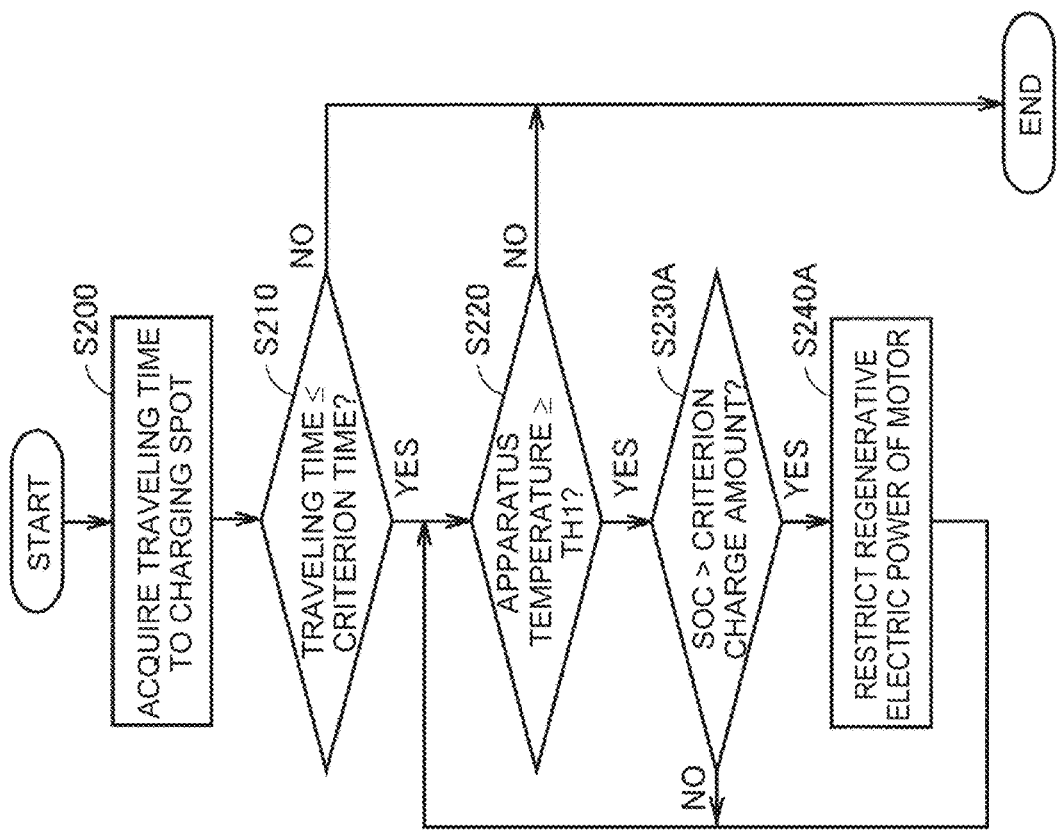
FIG. 5A is a flowchart for describing a process for the before-charging cooling control in a modification.
Figure 5B:
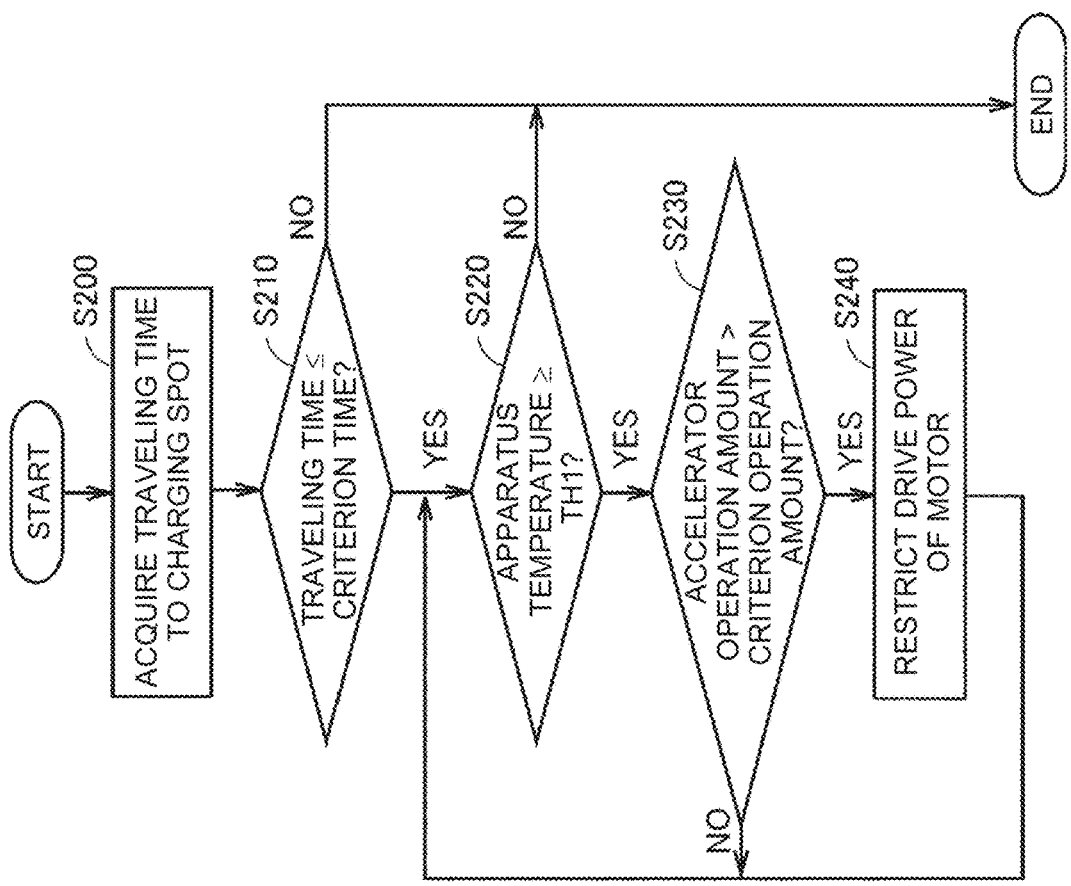
FIG. 5B is a flowchart for describing a process for the before-charging cooling control in a modification.

FIG. 5A and FIG. 5B are flowcharts for describing processes for the before-charging cooling control in the modifications. FIG. 5A is a flowchart in the case where the rise in the temperature of the charging group is restrained by the restriction of the drive power of the motor generator 130. FIG. 5B is a flowchart in the case where the rise in the temperature of the charging group is restrained by the restriction of the regenerative electric power of the motor generator 130.

With reference to FIG. 5A of FIGS. 5A and 5B, in S200, the ECU 300 acquires the predicted value of the traveling time to the destination or the charging spot near the destination, from the navigation device 170. Then, in S210, the ECU 300 determines whether the predicted traveling time is equal to or shorter than the criterion time, that is, whether the timing of the external charging is coming.

In the case where the predicted traveling time is longer than the criterion time (NO in S210), the ECU 300 determines that there is still a sufficient time to the execution of the external charging, and skips subsequent processes to end the process. On the other hand, in the case where the predicted traveling time is equal to or shorter than the criterion time (YES in S210), the ECU 300 determines that the timing of the external charging is coming. Then, the ECU 300 causes the process to proceed to S220, and determines that the temperature of each apparatus included in the charging group is equal to or higher than the threshold TH1.

In the case where the apparatus temperature is lower than the threshold TH1 (NO in S220), the cooling control is unnecessary, and therefore the ECU 300 skips subsequent processes to end the process. On the other hand, in the case where the apparatus temperature is equal to or higher than the threshold TH1 (YES in S220), the process proceeds to S230, and the ECU 300 determines whether the accelerator operation amount by the user is larger than the criterion operation amount.

In the case where accelerator operation amount is larger than the criterion operation amount (YES in S230), the process proceeds to S240, and the ECU 300 restricts the drive power of the motor generator 130. Thereafter, the process returns to S220. In the case where the accelerator operation amount is equal to or smaller than the criterion operation amount (NO in S230), the process returns to S220. Then, the ECU 300 continues the restriction of the drive power of the motor generator 130, until the apparatus temperature becomes lower than the threshold TH1.

Next, with reference to FIG. 5B of the FIGS. 5A and 5B, a case where the regenerative electric power of the motor generator 130 is restricted will be described. In FIG. 5B, steps S230 and S240 in FIG. 5A for the restriction of the drive power are replaced with steps S230A and S240A. Descriptions of the same steps as those in FIG. 5A are not repeated.

In the case where the predicted traveling time to the charging spot is equal to or shorter than the criterion time (YES in S210) and where the apparatus temperature is equal to or higher than the threshold TH1 (YES in S220), the ECU 300 determines whether the SOC of the battery 110 is higher than the criterion charge amount, in S230A. In the case where the SOC is higher than the criterion charge amount (YES in S230A), the process proceeds to S240A. In S240A, in the case where the brake operation amount by the user is larger than the criterion operation amount, the ECU 300 restricts the regenerative electric power by the motor generator 130, and thereafter the process returns to S220. In the case where the SOC is equal to or lower than the criterion charge amount (NO in S230A), the process returns to S220. Then, the ECU 300 continues the restriction of the regenerative electric power of the motor generator 130, until the apparatus temperature becomes lower than the threshold TH1.

As described above, also in the configuration in which only the restriction of the drive power or only the restriction of the regenerative electric power is performed, the temperature of the charging group is restrained from being excessively high at the time of the arrival at the charging spot, and therefore it is possible to restrain the decrease in the performance of the charging group including the rotating electric machine, and to efficiently perform charging processing.

Embodiment 2

In the embodiment 1, the traveling time to the charging spot is adopted as one of the conditions of the start of the before-charging cooling control. In an embodiment 2, a configuration in which the traveling distance to the destination is adopted as a condition of the start of the before-charging cooling control instead of the traveling time to the charging spot will be described.

Figure 6:
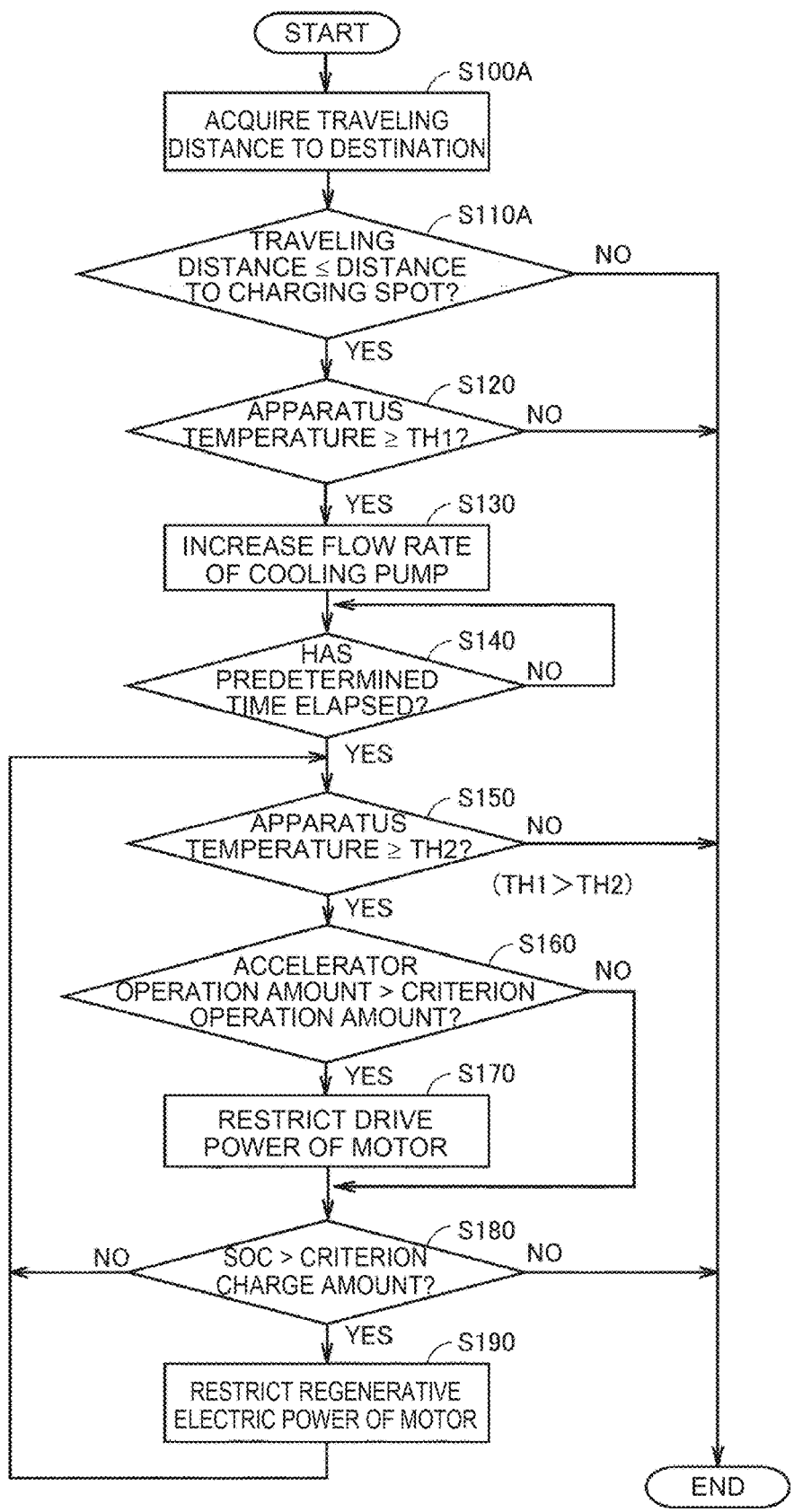
FIG. 6 is a flowchart for describing a process for the before-charging cooling control that is executed by the ECU in an embodiment 2.

FIG. 6 is a flowchart for describing a process for the before-charging cooling control that is executed by the ECU 300 in the embodiment 2. In the flowchart of FIGS. 6, S100 and S110 in the flowchart of FIG. 4 are replaced with S100A and S110A. The other steps in FIG. 6 are the same as those in FIG. 4, and descriptions of the steps in common with FIG. 4 are not repeated.

With reference to FIG. 6, in S100A, the ECU 300 acquires a predicted value of the traveling distance to the destination, from the navigation device 170. Then, in S110A, the ECU 300 determines whether the predicted traveling distance is equal to or shorter than the distance to the charging spot, that is, whether the timing of the external charging is coming.

In the case where the predicted traveling distance is longer than the distance to the charging spot (NO in S110A), the ECU 300 determines that there is still a sufficient time to the execution of the external charging, and skips subsequent processes to end the process.

On the other hand, in the case where the predicted traveling distance is equal to or shorter than the distance to the charging spot (YES in S110A), the ECU 300 determines that the timing of the external charging is coming. Then, the ECU 300 executes the before-charging cooling control by executing S120 and subsequent processes.

Also in the configuration of the embodiment 2, the temperature of the charging group is restrained from being excessively high at the time of the arrival at the charging spot, and therefore it is possible to restrain the decrease in the performance of the charging group including the rotating electric machine, and to efficiently perform charging processing.

It should be understood that the embodiments disclosed herein are examples and are not limitative in all respects. It is intended that the scope of the present disclosure is shown not by the above description of the embodiments but by the claims and includes all modifications in a meaning and range equivalent to the claims.

What is claimed is:
1. A vehicle comprising:
a battery capable of being charged and discharged;

a rotating electric machine configured to generate traveling drive power using electric power from the battery;
an electric power conversion device configured to convert direct-current power from the battery into alternating-current power and supply the alternating-current power to the rotating electric machine;
a charging device configured to charge the battery using electric power from outside; and
a control device, wherein:
when the battery is charged,
the charging device is configured to supply direct-current power to a neutral point of the rotating electric machine, and
the rotating electric machine and the electric power conversion device are configured to boost the direct-current power supplied from the charging device, and supply the direct-current power to the battery; and
during traveling, the control device is configured to
acquire a predicted value of a traveling time to a previously given charging place, and
execute a control that restrains rise in a temperature of a charging group in a case where the predicted traveling time is equal to or shorter than a criterion time and where a first condition is satisfied, the first condition being a condition that at least one of temperatures of the battery, the rotating electric machine and the electric power conversion device that are included in the charging group is higher than a criterion temperature.

2. The vehicle according to claim 1, further comprising a cooling device configured to cool the charging group, wherein
in a case where the first condition is satisfied, the control device is configured to increase cooling capacity of the cooling device, compared to a case where the temperature of the charging group is lower than the criterion temperature.

3. The vehicle according to claim 2, wherein:
the cooling device includes a cooling pump configured to circulate a refrigerant; and
in the case where the first condition is satisfied, the control device is configured to increase a refrigerant amount that is supplied by the cooling pump.

4. The vehicle according to claim 1, wherein in a case where the first condition is satisfied and where an accelerator operation amount by a user is larger than a criterion operation amount, the control device is configured to decrease the traveling drive power that is generated by the rotating electric machine, compared to a case where the temperature of the charging group is lower than the criterion temperature.

5. The vehicle according to claim 1, wherein in a case where the first condition is satisfied and where a charge amount stored in the battery is larger than a criterion charge amount, the control device is configured to decrease regenerative electric power that is generated by the rotating electric machine, compared to a case where the temperature of the charging group is lower than the criterion temperature.

6. A vehicle comprising:
a battery capable of being charged and discharged;
a rotating electric machine configured to generate traveling drive power using electric power from the battery;
an electric power conversion device configured to convert direct-current power from the battery into alternating-current power and supply the alternating-current power to the rotating electric machine;
a charging device configured to charge the battery using electric power from outside; and
a control device, wherein:
when the battery is charged,
the charging device is configured to supply direct-current power to a neutral point of the rotating electric machine, and
the rotating electric machine and the electric power conversion device are configured to boost the direct-current power supplied from the charging device, and supply the direct-current power to the battery; and
during traveling, the control device is configured to
acquire a predicted value of a traveling distance to a destination, and
execute a control that restrains rise in a temperature of a charging group in a case where the predicted traveling distance is equal to or shorter than a distance to a charging place and where a condition is satisfied, the condition being a condition that at least one of temperatures of the battery, the rotating electric machine and the electric power conversion device that are included in the charging group is higher than a criterion temperature.

* * * * *